Patented Sept. 10, 1946

2,407,292

UNITED STATES PATENT OFFICE 2,407,292

PRODUCT

Paul L. Salzberg, Carrcroft, Del., assignor to E. I. du Pont de Nemours & Company, Wilmington, Del., a corporation of Delaware No Drawing. Application December 18, 1943, Serial No. 514,818

6 Claims. (Cl. 260—454)

This invention relates to compositions of matter and is particularly directed to compounds selected from the class consisting of omega-polyhalo alkyl thiocyanates and omega-polyhalo alkenyl thiocyanates.

Many aliphatic thiocyanates are known in the art but for the most part they are either highly odoriferous, highly volatile and irritating to the mucous membrane, or relatively unstable. Many of such thiocyanates have been disclosed to have value for insecticidal purposes but they are either subject to the disadvantages mentioned or lack adequately high toxicity to a wide variety of insect pests or sufficient tolerance or certain varieties of foliage.

Among the various aliphatic thiocyanates known in the art are those containing a halogen substituent. Thus U. S. Patent 1,808,893 suggests broadly that iodine may be a substituent of an aliphatic thiocyanate and Wilcoxon et al., Contributions Boyce-Thompson Institute 7, 28–36 (1935), disclose 2-chloroethyl thiocyanate. Such thiocyanates, however, have the further disadvantage in that the halogen substituent is highly active. Such compounds do not have desirable characteristics and are difficult to prepare. This difficulty is readily evident when it is remembered that the common method of preparing organic thiocyanates is by replacement of an active halogen.

The new class of halogen-substituted aliphatic thiocyanates which I have now discovered to avoid the difficulties of the prior art, particularly the difficulties encountered in connection with halogen-substituted aliphatic thiocyanates in which a single highly active halogen is present on the omega carbon atom, may be represented by the formula $Hal_xRSCN$ in which Hal stands for halogen attached to omega carbon, $x$ is 2 or 3, and R is an alkyl or alkenyl radical. Thus if the omega carbon atom has three terminal valences the compounds may be represented by the formula $Hal_3CR'SCN$, whereas if the omega carbon atom has only two extra-linear valences the compounds may be represented by the formula $Hal_2C=CH—R''—SCN$ or $Hal_2CHR'''—SCN$. Thus my invention broadly embraces any alkyl or alkenyl thiocyanate in which two or more valences of the omega carbon atom are satisfied by halogen.

The compounds of my invention may be prepared by first making a suitable intermediate compound and then converting it to a thiocyanate. According to the customary method of preparing thiocyanates the intermediate may be the appropriate organic compound having reactive halogen which is replaced by the thiocyanate group by means of a thiocyanating agent such as sodium, potassium, zinc, barium, calcium, lead or like metallic thiocyanates. The following reaction is typical:

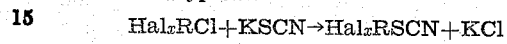

$$Hal_xRCl + KSCN \rightarrow Hal_xRSCN + KCl$$

The intermediate may be prepared in any suitable manner as, for example, by the methods disclosed in Hanford and Joyce, application Serial No. 433,466, Peterson application Serial No. 433,458, and Joyce application Serial No. 438,468, filed April 10, 1942.

The following examples are illustrative of suitable methods for preparing the compounds of my invention.

EXAMPLE 1

A mixture of 40 g. of 1-chloro-9,9,9-trichlorononane, 17.5 g. of potassium thiocyanate and 100 cc. of n-butyl alcohol was refluxed with stirring for 4 hours. After removal of the precipitated potassium chloride by filtration, the reaction solvent was distilled from the filtrate and the residue taken up in ether. This ether solution was washed with water until washing gave a negative test for thiocyanate ion. The ether solution was then dried over sodium sulfate. After removal of the drying agent and evaporation of the ether, the residual oil was distilled and the fraction boiling at 161–164° C./3 mm. amounted to 32.8 g. This colorless, oily fraction on analysis for nitrogen showed a content of 4.95%, as compared to a calculated value of 4.85% for this element.

A similar procedure, varying the refluxing time from 4 to 6 hours, was used in preparing other related products of this invention which are described below.

*Properties and identity of omega-polyhalogenoalkyl thiocyanate*

| Compound | B. P. | Analysis |
|---|---|---|
| 1-thiocyano-5,5,5-trichloropentane | 136–137° C./2 mm | Found: S=12.86%. |
| 1-thiocyano-7,7,7-trichloroheptane | 153–155° C./3 mm | Found: S=12.95%, N=5.33%. |
| 1-thiocyano-5,5,5-trifluoropentane | 82° C./3 mm | Found: S=17.33%. |

The preparative yield of the above compounds varied from 75 to 87% of the theoretical.

EXAMPLE 2

A mixture of 34.7 g. of 1,5,5-trichloropentene-4, 23.3 g. of potassium thiocyanate in 100 cc. of normal butyl alcohol was refluxed with stirring for 6 hours. The precipitated potassium chloride was removed by filtration and the filtrate was then distilled to remove most of the butyl alcohol. This filtrate was shaken up in ether and washed with water until the wash gave no test for thiocyanate ion. The ether solution was then dried over sodium sulfate. After separation of the drying agent from the solution and removal of the ether the residual oil was distilled and the fraction boiling at 111–116° C./2 mm. amounting to 34 g. of a colorless oil was collected. Analysis of this oil showed a nitrogen content of 6.52% as compared to a calculated value of 7.14% for 1-thiocyano-5,5-dichloropentene-4.

Using the general procedure above similar types of unsaturated omega-polyhalogenoalkenyl halides may be converted to the corresponding thiocyanates. For example, 1,5,5,5-tetrachloropentene-2 may be converted to the 1-thiocyano-5,5,5,-trichloropentene-2 by treatment of the above halide with a metallic thiocyanate or ammonium thiocyanate in approximately 10–20% excess over the theoretical quantity in the presence of a solvent such as butyl or ethyl alcohol.

While I have described my invention with reference to particular embodiments thereof it is to be understood that it is not limited thereto and that variations may be made without departing from the spirit thereof. Thus other types of omega-polyhalogenoalkyl and alkenyl halides may be produced and converted to the corresponding thiocyanate. For example, 1,5-chloro-5,5-difluoropentane and 1-chloro-5,5,5-trifluoropentane can be prepared from 1,5,5,5-tetrachloropentane by fluorination with hydrogen fluoride using a pentavalent antimony halide catalyst. Thus intermediates of the general formula $Hal_3C(R')_mHal$ where the radical R' is a polyethylene group such as

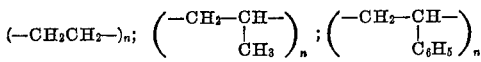

and similarly substituted polyethylene groups, and $n$ is greater than 1 and less than 7, can be prepared by the general methods described in the copending application of Hanford and Joyce, Serial No. 438,466 filed April 10, 1942, by reaction of carbon tetrachloride with propylene, isobutylene and styrene, respectively, and these omega-trihalo alkyl halides may be converted to omega-dihalo alkyl and alkenyl halides by dehydrohalogenation followed, if desired, by hydrogenation or other processing of the double bond.

The products of my invention are useful in pest control, especially as contact insecticides. They are of particular value for use in hydrocarbon fly sprays because of their lack of odor and lack of irritancy to the mucous membrane. They are also of value as lubricating oil adjuvants, as plasticizers for polymeric materials, particularly cellulose compositions and as intermediates for a wide variety of syntheses.

I claim:

1. Compounds of the formula $Hal_3CRSCN$ where R is a polyethylene group containing less than seven ethylene groups and where Hal stands for halogen.

2. Compounds of the formula

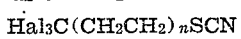

where $n$ is greater than 1 and less than 7 and where Hal stands for halogen.

3. Compounds of the formula $Cl_3C(R)_nSCN$ where R is a polyethylene group containing less than seven ethylene groups.

4. Compounds of the formula

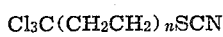

where $n$ is greater than 1 and less than 7.

5. 1-thiocyano-5,5,5-trichloropentane.

6. Compounds selected from the class consisting of organic thiocyanates represented by the formula $Hal_3CRSCN$ and $Hal_2C{=}CHRSCN$ wherein Hal is halogen and R is an alkylene radical.

PAUL L. SALZBERG.